June 23, 1959
S. F. ARMINGTON, JR
2,891,767
HOIST WITH GEAR REDUCTION
Filed Dec. 17, 1954
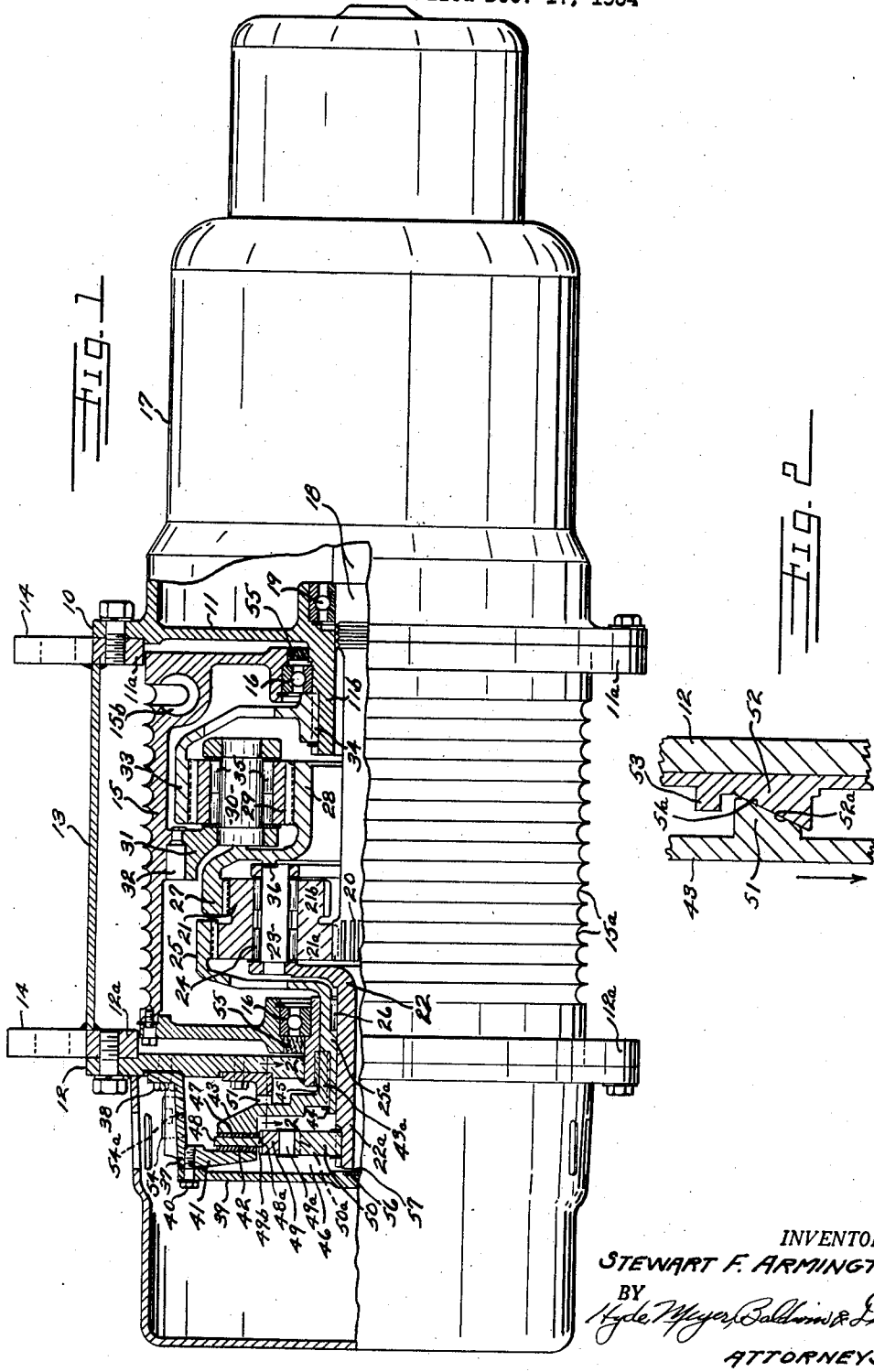
INVENTOR.
STEWART F. ARMINGTON JR
BY
ATTORNEYS United States Patent Office 2,891,767
Patented June 23, 1959

2,891,767
HOIST WITH GEAR REDUCTION

Stewart F. Armington, Jr., Cleveland, Ohio, assignor to The Euclid Crane & Hoist Company, Cleveland, Ohio, a corporation of Ohio Application December 17, 1954, Serial No. 476,029

9 Claims. (Cl. 254—186)

This invention relates to improvements in a self-contained hoist and more particularly of a hoist wherein a housing supports a rotatable drum, a motor, and reduction gearing for driving the drum by means of the motor.

One of the objects of the present invention is the provision of novel driving mechanism completely housed within a hollow drum and more particularly of a differential planetary drive system in series with a simple planetary system.

Another object of the present invention is to provide a motor drive for a planetary driving system wherein the motor shaft has a bearing in the housing and extends from that point inwardly into the drum where the sun gear for a planetary system is self-centering in its coacting planet gears and without any bearing at the free end of the motor shaft.

Another object of the present invention is to provide drive gearing for the hoisting drum running in oil, and a brake for holding the load as it is lowered, also running in oil, with the two oil reservoirs completely separated so that the lubrication for the driving gears is not unnecessarily heated by the heat generated during the braking action.

Still another object of the present invention is to provide novel brake applying means actuated from a reaction gear member in the drum driving mechanism, whereby the reaction gear has a slight oscillatory motion which works through a set of cams to apply the brake.

Other novel features of the invention reside in the design and arrangement of the parts to provide a compact and efficient hoist.

Other objects and advantages of the present invention will be apparent from the accompanying drawings and description and the essential features thereof will be set forth in the appended claims.

In the drawings,

Fig. 1 is a side elevational view of a hoist embodying my invention partly broken away in central longitudinal section in order to more clearly disclose the arrangement of the parts; while Fig. 2 is an enlarged fragmental sectional view taken along the line 2—2 of Fig. 1 showing a detail of the brake applying cams.

In the embodiment of my invention shown in the drawings, a housing 10 comprises opposite end plates 11 and 12 connected by a shield 13 which extends across the top and part way down the sides of the housing. Preferably, upstanding ears 14 are provided on the housing so that the same may be slung from an overhead support as is customarily done in the use of this type of hoist.

A hoisting drum 15 is rotatably mounted on bearings 16 which rest directly or indirectly on the housing 10. It will be noted that this drum clears the heavy rings 11a and 12a which are welded to shield 13 and bolted to the frame end plates 11 and 12 to provide strength and to provide lifting means integral with the ears 14. It will also be noted that the drum is grooved in the usual manner as indicated at 15a to receive the hoisting cable. The end of the hoisting cable is fastened in the socket at 15b in any satisfactory manner.

Connected to the housing 10 at the right-hand end thereof as viewed in Fig. 1 is an electric motor 17 which has an output shaft 18 extending axially of the drum 15. The motor is provided with a source of electric current for the driving of the same by any of the usual means, not shown. The member 11 forms a portion of the housing 10 and at the same time forms a base for the motor 17. The shaft 18 is provided with an anti-friction bearing 19 in the end plate 11 of the main housing 10. It will be noted that the motor shaft 18 extends a considerable distance inside of the drum but no further bearing is provided inwardly from the bearing 19 for reasons which will later appear.

A planetary drive system is provided between motor shaft 18 and drum 15. Preferably, as shown in the drawings, this takes the form of two planetary drives in series. A sun gear 20 is formed on the free end of the motor shaft 18. This gear meshes with the pinions 21a of a set of three differential planet gears 21 which are positioned 120 degrees arcuately apart in the usual manner on a planet gear carrier 22 which has three pins 23 parallel to the axis of shaft 18 and positioned arcuately 120 degrees apart around a circle. By means of roller bearings 24, the differential planet gears 21 are rotatably mounted on the pins 23. A ring gear 25 surrounds the planet gears 21 in the usual fashion and meshes with the planet gears. The ring gear has a hub 25a extending toward the left as viewed in Fig. 1 and radially outside of and resting upon the hub 22a of the planet gear carrier 22. The ring gear 25 is relatively stationary as will presently appear and the hub 22a is rotatably within the hub 25a with anti-friction bearings 26 provided as shown in Fig. 1. A second ring gear 27 meshes with the pinions 21b of the differential planet gears 21 so as to form the output gear for the first planetary drive. A second sun gear 28 is carried by the same frame which carries the ring gear 27. This sun gear meshes with a set of three planet gears 29 each of which is rotatably mounted on a pin 30, which pins in turn are mounted in a second planet gear carrier 31 on axes parallel to the axis of shaft 18 and positioned so that the pins 30 are 120 degrees apart around the planet carrier 31. This planet carrier is secured rigidly to the drum 15 by means of four key pins 32. A third ring gear 33 meshes with the three planet gears 29 and is keyed at 34 to a collar 11b which is rigid with the housing end plate 11. Anti-friction bearings 35 are provided between gears 29 and pins 30. An annular Phosphor bronze ring 36 is secured in an annular groove in carrier 22 as clearly shown in Fig. 1 and enters snugly into notches cut in the three pins 23. This serves to keep the pins 23 from turning and also locates the ring gear 27 axially.

A mechanical brake is provided to hold back the load whenever the drum is rotated in a direction to lower such a load. This mechanical brake is entirely independent of the usual electrodynamic brake which is applied to motor 17 in the usual manner whenever the electric current is turned off. For housing the mechanical brake, hollow chamber means is provided comprising an annular ring 37 bolted to the outer face of the housing wall 12 by means of a series of bolts 38. A circular end wall 39 is bolted to the side wall 37 by a series of bolts 40. These bolts also rigidly hold an annular abutment 41 preferably made of cast iron or Meehanite. A movable brake shoe 43 is provided in the form of an annular ring having a hub 43a which is splined at 44 to the hub 25a. This holds the brake shoe 43 from rotation while at the same time permitting its movement endwise along the spline 44. A cylindrical seal 45 is provided to prevent leakage back and forth between the hollow drum 15 and the hollow chamber means 46. Rings of brake lining material 42 and 47 float between the brake applying ring 48 and abutment 41 and brake shoe 43 respectively.

An over-running clutch connection is provided between the mechanical brake just described and the hub 22a. This comprises the annular flat ring 48 lying between the brake lining 42 and 47. This ring carries an internal spline 48a which meshes with an external spline 49b on member 49 which forms the outer member of the over-running clutch. The inner member is the disk or wheel 50 which is keyed to the hub 22a. The inner member 50 is provided with a series of ratchet teeth 50a with which cooperate the series of dogs 49a carried by the outer member 49 in the usual manner. The dogs 49a engage drivingly in the ratchet teeth 50a only when the hub 22a is running in a direction corresponding to lowering of a load by the unwinding of the cable from the drum 15. When the drum is operating in the direction to raise a load, the hub 22a runs in such a direction that the clutch member 50 is carried past the clutch member 49 in a non-driving manner.

Novel means is provided for applying the brake just described. Formed on or secured to, the brake disk 43 are a plurality, preferably three spaced arcuately 120 degrees apart, of cams 51 having inclined surfaces 51a, all of these being inclined in the same direction on all of the cams 51. Coacting cams 52 are fixed in place on the housing wall 12 and these have inclined cam surfaces 52a which are complementary to or inclined in the opposite direction from the surfaces 51a. When the hoist is operating with a load carried by the cable on drum 15, the ring gear 25 is urged in such a direction that it carries its hub 25a and the brake disk 43 in the direction of the arrow of Fig. 2. This causes the inclined surfaces to cam against each other so that the brake disk 43 is moved toward the fixed abutment 41 causing the splined disk 48, 48a to be frictionally held between the brake linings 42 and 47. When lowering a load the over-running clutch is in driving engagement, as previously described, so that the brake is effective on the hub 22a to hold back the planetary gear drive and act as a machanical brake while the load is being lowered.

On the other hand, when a load is being raised, the ring gear 25 is still urged in the same direction so as to cause the effect just described of applying the mechanical brake. At such time, however, the over-running clutch is not in driving relationship but the dogs 49a are passing idly over the ratchet teeth 50a and, therefore, the brake exerts no dragging effect upon the hub 22a.

At such time as there is no load on the drum 15, the ring gear 25 has a reaction tending to carry it in the direction opposite to the arrow of Fig. 2. This causes the cam 51 to back away slightly from the cam 52 and such movement is limited by stop 53 which is located a very short distance, for instance approximately ⅛ inch away from the cam 51 as shown in Fig. 2, so that the oscillation of the ring gear 25 is limited to the slight movement shown as being possible in Fig. 2. The parts are so designed that it is impossible for cams 51 to be forced past cams 52 when the force is action in the direction of the arrow of Fig. 2.

In use, the hollow chamber means 46, housing the mechanical brake, is filled with oil up to the level of the spline 48a or thereabouts. A plug 54 is provided for this purpose having an air vent 54a to prevent the trapping of an air pocket in the hollow chamber means. In a similar manner, the hollow of drum 15 is filled with oil preferably up to the level of about the teeth of ring gear 27 through a filling plug not shown. The drum thus forms an oil reservoir and leakage out of the drum is prevented by means of annular oil seals 55.

Thus, it is possible to maintain the oil in the chamber 46 at a level which is higher than the optimum level desired for the oil in the drum 15. Also, having these two oil reservoirs completely separated by the partition 12 allows the oil in chamber 16 to become heated by the action of the brake without heating the oil which lubricates the planetary drive. This is a very valuable improvement.

A Phosphor bronze button 56 limits endwise movement of hub 22a toward the left as viewed in Fig. 1. A narrow diametrically extending slot 57 is provided crosswise of the left end of hub 22a and permits breathing air blow between the hollow drum and the brake chamber.

It will be noted that my improved hoist provides differential and simple planetaries in series with the simple planetary system being the last reduction in the drive connection, so as to provide the most efficient drive for the reduction having the greatest torque.

What is claimed is:

1. A hoist comprising a housing, a hollow drum rotatably mounted in said housing, drive means for said drum including a motor mounted on said housing and including a rotatable member in the hollow of said drum and having a permanently geared holding connection with said motor, a drive means lubrication reservoir within the hollow of said drum, hollow chamber means mounted on said housing adjacent said drum, partition means separating said hollow chamber means from said reservoir, said rotatable member extending in a sealed manner through said partition means into said hollow chamber means, and a brake in said chamber means operatively connected with said member to retard it, whereby lubricating liquid in said reservoir is held out of direct contact with said brake and out of communication with said hollow chamber means.

2. A hoist comprising a housing, a drum rotatably mounted in said housing, drive means including a motor operatively connected with said drum and including a relatively stationary reaction gear member having limited arcuate oscillation, a brake operatively connected with said drive means and having a permanently geared holding connection with said motor for retarding the latter, and means for applying said brake operatively connected with said gear member for application of said brake responsive to said limited oscillation of said gear member.

3. The combination of claim 2 wherein said brake applying means includes a first cam fixed relative to said housing and a coacting cam operatively associated with said gear member and with said brake and movable to apply said brake by movement of said coacting cam relative to said first cam.

4. A hoist comprising a housing, a hollow cable-winding drum rotatably mounted on said housing, a motor mounted on said housing, planetary drive means operatively connected between said motor and said drum including a sun gear rotatable by said motor, a ring gear mounted for limited arcuate oscillation in said housing, a planet gear carrier drivingly connected with said drum, and a plurality of planet gears rotatably mounted on said carrier and drivingly meshing between said sun gear and said ring gear, said planetary drive means being wholly within the hollow of said drum which provides a reservoir for lubricant, said ring gear having a hub extending away from said drum and outside of said housing, a brake shoe having a splined connection with said hub, said shoe being mounted for movement axially, a brake applied by said movement of said shoe axially, said brake having an over-running clutch connection with said carrier, said clutch having a driven connection with said carrier only when said carrier is rotating in a direction corresponding to load-lowering rotation of said drum, arcuately spaced cam means on said shoe, coacting fixed cam means on said housing, and said cam means camming said shoe along said spline in brake-applying direction by limited arcute oscillation of said ring gear responsive to drum-rotating operation of said planetary drive means.

5. A unitary portable hoist comprising a housing, a hollow cable-winding drum rotatably mounted on one end of said housing, there being openings in the bottom of said housing to accommodate cables winding on said drum, a power motor mounted in the other end of said housing coaxial with said drum, and planetary drive means operatively connected between said motor and said drum including a sun gear operatively connected for rotation by said motor, a ring gear rigidly connected with said housing, a planetary gear carrier drivingly mounted on the inside wall of said drum, a plurality of planet gears rotatably mounted on said carrier and meshing between said sun gear and said ring gear, said planetary drive means being wholly within the hollow of said drum, said hollow drum providing a lubrication reservoir for lubricating said planetary drive means, hollow chamber means secured to said housing and partitioned to prevent communication with the lubricant reservoir in the drum, a member rotatable with a portion of said planetary drive means and having a permanently geared holding connection with the motor and extending in a sealed manner through said partition into said hollow chamber means, and a brake in said chamber means operatively connected with said member to retard it, whereby lubricating liquid in said reservoir is held out of direct contact with said brake and out of communication with said hollow chamber means.

6. The combination of claim 5 wherein said brake includes an abutment fixed relative to said housing and a brake shoe movable toward said abutment and a brake applying ring between said shoe and abutment, an overrunning clutch connection between said brake applying ring and said member rotatable with a portion of said planetary drive means, said clutch having a driving connection only when said last named member is rotating in a direction corresponding to load-lowering rotation of said drum, said planetary drive means including a relatively stationary reaction gear member having limited arcuate oscillation, and cam means operatively connected between said reaction gear member and said brake shoe causing engagement of said brake applying ring between said shoe and said abutment by limited arcuate oscillation of said reaction gear member responsive to drum-rotating operation of said planetary drive means.

7. A unitary portable hoist comprising a housing, a hollow cable-winding drum rotatably mounted on one end of said housing, there being openings in the bottom of said housing to accommodate cables winding on said drum, a power motor mounted in the other end of said housing coaxial with said drum, said motor having an output shaft extending axially through said drum, and planetary drive means operatively connected between said motor and said drum including a first sun gear mounted on said output shaft for rotation by said motor at a point on said shaft remote from said motor, a first ring gear substantially fixed on said housing and radially spaced outside of said sun gear, a first planet gear carrier rotatably mounted coaxially with said sun gear, a plurality of differential planet gears rotatably mounted on said carrier and drivingly meshing between said sun gear and ring gear, a second ring gear drivingly meshing with said differential planet gears, a second sun gear rigidly connected with said second ring gear and axially spaced therefrom toward said motor, a third ring gear radially spaced outside of said second sun gear and rigid with said housing, a second planet gear carrier rigid with said drum, and a plurality of planet gears rotatably mounted on said second carrier and drivingly meshing between said second sun gear and said third ring gear.

8. The combination of claim 7 including a lubrication reservoir in said drum embracing said planetary drive means, hollow chamber means in said one end of said housing partitioned to prevent communication with said reservoir, said first planet gear carrier having a hub extending into said chamber means, and a brake in said chamber means operatively connected with said hub to retard it, whereby lubricating liquid in said reservoir is out of direct contact with said brake.

9. A hoist comprising a housing, a hollow drum rotatably mounted in said housing, drive means for said drum including a motor mounted on said housing and including a rotatable member in the hollow of said drum and having a permanently geared holding connection with said motor, a drive means lubrication reservoir within the hollow of said drum, hollow chamber means mounted on said housing adjacent said drum, partition means separating said hollow chamber means from the hollow of said drum, said rotatable member extending in a sealed manner through said partition means into said hollow chamber means, and a brake in said chamber means operatively connected with said member to retard it.

References Cited in the file of this patent
UNITED STATES PATENTS

| | | |
|---|---|---|
| 1,632,123 | Else | June 14, 1927 |
| 1,763,023 | Tyler | June 10, 1930 |
| 2,256,296 | Smith | Sept. 16, 1941 |
| 2,458,459 | Wright | Jan. 4, 1949 |
| 2,529,330 | Double | Nov. 7, 1950 |
| 2,543,811 | Snow et al | Mar. 6, 1951 |
| 2,552,000 | Du Bois | May 8, 1951 |
| 2,710,738 | Wittberger | June 14, 1955 |